(12) United States Patent
Song

(10) Patent No.: US 12,087,916 B2
(45) Date of Patent: Sep. 10, 2024

(54) BMS MANAGING APPARATUS AND METHOD

(71) Applicant: LG ENERGY SOLUTION, LTD., Seoul (KR)

(72) Inventor: Yee-Gahng Song, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 173 days.

(21) Appl. No.: 17/799,840

(22) PCT Filed: Nov. 15, 2021

(86) PCT No.: PCT/KR2021/016657
§ 371 (c)(1),
(2) Date: Aug. 15, 2022

(87) PCT Pub. No.: WO2022/108274
PCT Pub. Date: May 27, 2022

(65) Prior Publication Data
US 2023/0089122 A1    Mar. 23, 2023

(30) Foreign Application Priority Data
Nov. 17, 2020  (KR) .......... 10-2020-0153902

(51) Int. Cl.
*H01M 10/42* (2006.01)
*G06F 15/163* (2006.01)

(52) U.S. Cl.
CPC ...... *H01M 10/4207* (2013.01); *G06F 15/163* (2013.01); *H01M 2010/4271* (2013.01)

(58) Field of Classification Search
CPC ............ G01R 31/396; H01M 10/4207; H01M 2010/4271; G06F 15/163
See application file for complete search history.

(56) References Cited

U.S. PATENT DOCUMENTS

2011/0161024 A1* 6/2011 Sim ............... H01M 10/441
                                              702/63
2012/0268069 A1  10/2012 Park et al.
(Continued)

FOREIGN PATENT DOCUMENTS

CN   111384455 A   7/2020
JP   2018-59917 A  4/2018
(Continued)

OTHER PUBLICATIONS

International Search Report (PCT/ISA/210) issued in PCT/KR2021/016657 mailed on Feb. 24, 2022.

*Primary Examiner* — Minh Q Phan
(74) *Attorney, Agent, or Firm* — Birch, Stewart, Kolasch & Birch, LLP

(57) ABSTRACT

A BMS managing apparatus including a master BMS and a plurality of slave BMSs, and includes: a master BMS for sending an NV (non-volatile) value confirmation request to the plurality of slave BMSs, and sending a uniformization request to the plurality of slave BMSs based on whether a source ID is set, when a response to the NV value confirmation request is received from the plurality of slave BMSs; and a plurality of slave BMSs for sending each NV value to the master BMS when the NV value confirmation request is received from the master BMS, setting a representative BMS and a target BMS based on the plurality of NV values, setting the representative BMS or a slave BMS corresponding to the source ID as a source BMS according to the uniformization request received from the master BMS, and updating an NV value of the target BMS according to an NV value of the source BMS.

11 Claims, 10 Drawing Sheets

(56) References Cited

U.S. PATENT DOCUMENTS

| | | |
|---|---|---|
| 2017/0010896 A1 | 1/2017 | Alari et al. |
| 2017/0237707 A1 | 8/2017 | Jo |
| 2018/0097375 A1 | 4/2018 | Lee |
| 2019/0265304 A1 | 8/2019 | Kim et al. |
| 2021/0247461 A1 | 8/2021 | Park |

FOREIGN PATENT DOCUMENTS

| | | |
|---|---|---|
| KR | 10-2011-0074207 A | 6/2011 |
| KR | 10-1245279 B1 | 3/2013 |
| KR | 10-1423961 B1 | 7/2014 |
| KR | 10-1641435 B1 | 7/2016 |
| KR | 10-1682788 B1 | 12/2016 |
| KR | 10-1732234 B1 | 5/2017 |
| KR | 10-2019-0010032 A | 1/2019 |
| KR | 10-2020-0059965 A | 5/2020 |
| KR | 10-2020-0086956 A | 7/2020 |

\* cited by examiner

BMS MANAGING APPARATUS AND METHOD

TECHNICAL FIELD

The present application claims priority to Korean Patent Application No. 10-2020-0153902 filed on Nov. 17, 2020 in the Republic of Korea, the disclosures of which are incorporated herein by reference.

The present disclosure relates to a BMS (Battery Management System) managing apparatus and method, and more particularly, to a BMS managing apparatus and method capable of effectively updating a plurality of slave BMSs.

BACKGROUND ART

Recently, the demand for portable electronic products such as notebook computers, video cameras and portable telephones has increased sharply, and electric vehicles, energy storage batteries, robots, satellites and the like have been developed in earnest. Accordingly, high-performance batteries allowing repeated charging and discharging are being actively studied.

Batteries commercially available at present include nickel-cadmium batteries, nickel hydrogen batteries, nickel-zinc batteries, lithium batteries and the like. Among them, the lithium batteries are in the limelight since they have almost no memory effect compared to nickel-based batteries and also have very low self-charging rate and high energy density.

In general, an energy storage system (ESS) includes a plurality of battery racks as a system unit, and each of these battery racks may include a BMS. However, in this BMS, a system value (e.g., an NV value, or the like) is set by the manual operation of an operator. For example, when the BMS of the battery rack is replaced, the operator sets the system value of the replaced BMS to be the same as the system value of other BMSs.

However, when the operator directly sets the system value of the BMS, there is a cost and risk of mistake, so a method that may handle this work at the system level through communication between BMSs is required.

DISCLOSURE

Technical Problem

The present disclosure is designed to solve the problems of the related art, and therefore the present disclosure is directed to providing a BMS managing apparatus and method capable of effectively updating and synchronizing NV values by a plurality of slave BMSs.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

A BMS managing apparatus according to one aspect of the present disclosure is a device including a master BMS and a plurality of slave BMSs, and may comprise: a master BMS configured to send an NV value (non-volatile value) confirmation request to the plurality of slave BMSs, and send a uniformization request to the plurality of slave BMSs based on whether a source ID is set, when a response to the NV value confirmation request is received from the plurality of slave BMSs; and a plurality of slave BMSs configured to send each NV value to the master BMS when the NV value confirmation request is received from the master BMS, set a representative BMS and a target BMS based on the plurality of NV values, set the representative BMS or one of the plurality of slave BMSs corresponding to the source ID as a source BMS according to the uniformization request received from the master BMS, and update an NV value of the target BMS according to an NV value of the source BMS.

When an ID for any one of the plurality of slave BMSs is received from the outside, the master BMS may be configured to set the received ID as the source ID.

The master BMS may be configured to send a first uniformization request including the source ID to the plurality of slave BMSs, when the source ID is set.

The master BMS may be configured to send a second uniformization request not including the source ID to the plurality of slave BMSs, when the source ID is not set.

The plurality of slave BMSs may be configured to set a slave BMS corresponding to the source ID as the source BMS, when the first uniformization request is received.

The plurality of slave BMSs may be configured to set the representative BMS as the source BMS, when the second uniformization request is received.

After setting the representative BMS and the target BMS, when the uniformization request is not received for a predetermined time, the plurality of slave BMSs may be configured to set the representative BMS as the source BMS.

The plurality of slave BMSs may be configured to generate a major group and at least one minor group according to the number of slave BMSs included in a group including slave BMSs having the same NV value, set any one of the plurality of slave BMSs included in the major group as the representative BMS, and set a slave BMS included in the at least one minor group as the target BMS.

The plurality of slave BMSs may be configured to set a slave BMS having an ID corresponding to a preset condition among the plurality of slave BMSs included in the major group as the representative BMS.

The master BMS may be configured to store an NV value for the source BMS at a previous updating time as a criterion NV value, and when the plurality of NV values received from the plurality of slave BMSs are classified into the same number, the master BMS may be configured to set an ID for any one of the plurality of slave BMSs having the same NV value as the criterion NV value among the plurality of NV values as the source ID.

The source BMS may be configured to receive whether the NV value is updated and an updated NV value from the target BMS, and send a uniformization completion notification or a uniformization failure notification to the master BMS according to whether the updated NV value received from the target BMS is the same as the NV value of the source BMS.

An energy storage system according to another aspect of the present disclosure may comprise the BMS managing apparatus according to an aspect of the present disclosure.

A BMS managing method according to still another aspect of the present disclosure is a method performed by a BMS managing apparatus including a master BMS and a plurality of slave BMSs, and may comprise: an NV value confirmation requesting step of sending an NV value confirmation request to the plurality of slave BMSs; an NV value sending step of sending each NV value to the master BMS when the NV value confirmation request is received from the master BMS; a representative BMS and target BMS setting step of setting a representative BMS and a target BMS based on the plurality of NV values; a uniformization request sending step of sending a uniformization request to the plurality of slave BMSs based on whether a source ID is set, when a response to the NV value confirmation request is received from the plurality of slave BMSs; a source BMS setting step of setting the representative BMS or one of the plurality of slave BMSs corresponding to the source ID as a source BMS according to the uniformization request received from the master BMS; and an NV value updating step of updating an NV value of the target BMS according to an NV value of the source BMS.

Advantageous Effects

According to one aspect of the present disclosure, there is an advantage that the plurality of slave BMSs may autonomously update the NV value not only when the source ID is specified by the master BMS but also when the source ID is not specified.

The effects of the present disclosure are not limited to the effects mentioned above, and other effects not mentioned will be clearly understood by those skilled in the art from the description of the claims.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Additionally, in describing the present disclosure, when it is deemed that a detailed description of relevant known elements or functions renders the key subject matter of the present disclosure ambiguous, the detailed description is omitted herein.

The terms including the ordinal number such as "first", "second" and the like, may be used to distinguish one element from another among various elements, but not intended to limit the elements by the terms.

Throughout the specification, when a portion is referred to as "comprising" or "including" any element, it means that the portion may include other elements further, without excluding other elements, unless specifically stated otherwise.

In addition, throughout the specification, when a portion is referred to as being "connected" to another portion, it is not limited to the case that they are "directly connected", but it also includes the case where they are "indirectly connected" with another element being interposed between them.

Hereinafter, preferred embodiments of the present disclosure will be described in detail with reference to the accompanying drawings.

Figure 1:
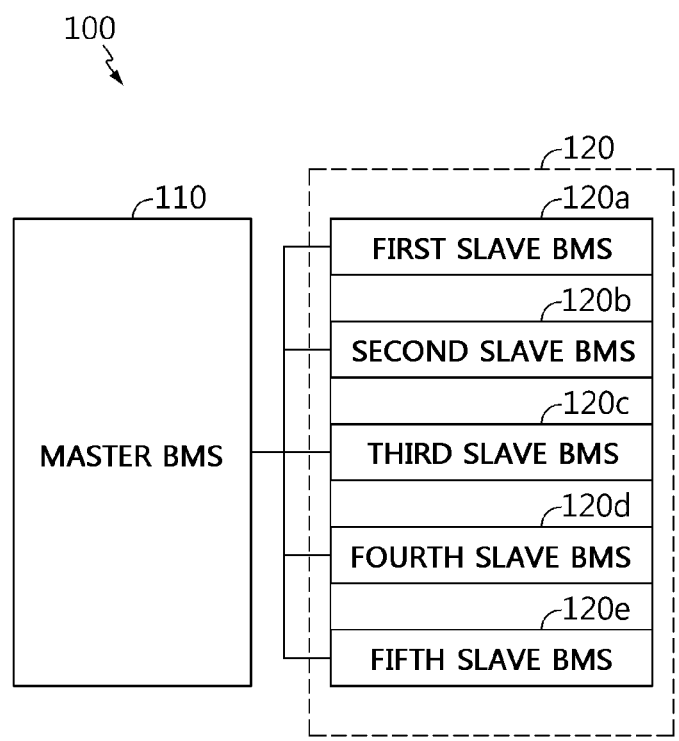
FIG. 1 is a diagram schematically showing a BMS managing apparatus according to an embodiment of the present disclosure.

FIG. 1 is a diagram schematically showing a BMS managing apparatus 100 according to an embodiment of the present disclosure.

Referring to FIG. 1, the BMS managing apparatus 100 may include a master BMS 110 and a plurality of slave BMSs 120.

For example, the master BMS 110 may be a higher-rank BMS of the slave BMS.

The master BMS 110 may be configured to send a non-volatile (NV) value confirmation request to the plurality of slave BMSs 120.

For example, in the embodiment of FIG. 1, the master BMS 110 may be connected to the plurality of slave BMSs 120, respectively. The master BMS 110 may send an NV value confirmation request to each of a first slave BMS 120a, a second slave BMS 120b, a third slave BMS 120c, a fourth slave BMS 120d and a fifth slave BMS 120e.

When a response to the NV value confirmation request is received from the plurality of slave BMSs 120, the master BMS 110 may be configured to send a uniformization request to the plurality of slave BMSs 120 based on whether a source ID is set.

For example, when the master BMS 110 receives all of the NV value confirmation requests from each of the plurality of slave BMSs 120, the master BMS 110 may send a uniformization request to the plurality of slave BMSs 120. In this case, the master BMS 110 may identically send a first uniformization request or a second uniformization request to the plurality of slave BMSs 120 according to whether the source ID is set.

That is, when the source ID is set, the master BMS 110 may be configured to send the first uniformization request including the source ID to the plurality of slave BMSs 120.

Conversely, when the source ID is not set, the master BMS 110 may be configured to send the second uniformization request not including the source ID to the plurality of slave BMSs 120.

In the embodiment of FIG. 1, the master BMS 110 may send the uniformization request to the plurality of slave BMSs 120 when all of the NV value confirmation requests are received from the plurality of slave BMSs 120.

The plurality of slave BMSs 120 may be configured to send each NV value to the master BMS 110 when the NV value confirmation request is received from the master BMS 110.

Each of the plurality of slave BMSs 120 may send its NV value to the master BMS 110 as a response to the NV value confirmation request. Preferably, the plurality of slave BMSs 120 may generate a hash value for the NV value using the same hash function. In addition, the plurality of slave BMSs 120 may send the generated hash value to the master BMS 110.

For example, in the embodiment of FIG. 1, each of the first slave BMS 120a, the second slave BMS 120b, the third slave BMS 120c, the fourth slave BMS 120d and the fifth slave BMS 120e may send its NV value as a response to the NV value confirmation request.

The plurality of slave BMSs 120 may be configured to set a representative BMS and a target BMS based on the plurality of NV values. When the plurality of slave BMSs 120 receives an NV value confirmation request from the master BMS 110, the plurality of slave BMSs 120 may set a representative BMS and a target BMS based on the plurality of NV values. Preferably, the plurality of slave BMSs 120 may set the representative BMS and the target BMS after sending the NV value to the master BMS 110.

For example, in the embodiment of FIG. 1, each of the plurality of slave BMSs 120 may have an NV value. That is, the number of the plurality of NV values may be five. The plurality of slave BMSs 120 may set any one of the plurality of slave BMSs 120 as a representative BMS based on the five NV values. In addition, the plurality of slave BMSs 120 may set the target BMS based on the five NV values. Specific details of setting the representative BMS and the target BMS by the plurality of slave BMSs 120 based on the plurality of NV values will be described later.

The plurality of slave BMSs 120 may be configured to set the representative BMS or a slave BMS corresponding to the source ID as the source BMS according to the uniformization request received from the master BMS 110.

Specifically, the plurality of slave BMSs 120 may set the representative BMS or the slave BMS corresponding to the source ID as the source BMS according to whether the source ID is included in the uniformization request received from the master BMS 110.

That is, the plurality of slave BMSs 120 may be configured to set a slave BMS corresponding to the source ID as the source BMS when the first uniformization request is received. Conversely, the plurality of slave BMSs 120 may be configured to set the representative BMS as the source BMS when the second uniformization request is received.

The plurality of slave BMSs 120 may be configured to update the NV value of the target BMS according to the NV value of the source BMS.

For example, in the embodiment of FIG. 1, when the NV value of the first slave BMS 120a and the NV value of the second to fourth slave BMSs 120b to 120d are the same and the NV value of the fifth slave BMS 120e is different, it is assumed that the first slave BMS 120a is set as the source BMS and the fifth slave BMS 120e is set as the target BMS.

That is, the second slave BMS 120b, the third slave BMS 120c, and the fourth slave BMS 120d may not be set as the target BMS. The first slave BMS 120a may send its NV value to the fifth slave BMS 120e to update the NV value of the fifth slave BMS 120e to be the same as the NV value of the first to fourth slave BMSs 120a to 120d.

The BMS managing apparatus 100 according to an embodiment of the present disclosure has an advantage that the plurality of slave BMSs 120 may autonomously update the NV value not only when the source ID is specified by the master BMS 110 but also when the source ID is not specified.

For example, even if the source ID is missing in the uniformization request received from the master BMS 110 by the plurality of slave BMSs 120 or is lost due to communication failure, the plurality of slave BMSs 120 may update the NV value normally by setting the source BMS by itself.

Meanwhile, the master BMS 110 and the plurality of slave BMSs 120 may include a control unit and a storage unit.

Meanwhile, the control unit may optionally include a processor, an application-specific integrated circuit (ASIC), another chipset, a logic circuit, a register, a communication modem, and a data processing device, and the like, known in the art to execute various control logics performed in the present disclosure. In addition, when the control logic is implemented in software, the control unit may be implemented as a set of program modules. At this time, the program module may be stored in a memory and executed by the control unit. The memory may be provided in or out of the control unit, and may be connected to the control unit by various well-known means.

In addition, the storage unit may store data or programs necessary for operation and function of each component of the master BMS 110 and the plurality of slave BMSs 120, data generated in the process of performing the operation or function, or the like. The storage unit is not particularly limited in its kind as long as it is a known information storage means that can record, erase, update and read data. As an example, the information storage means may include RAM, flash memory, ROM, EEPROM, registers, and the like. In addition, the storage unit may store program codes in which processes executable by the control unit are defined.

When an ID for any one of the plurality of slave BMSs 120 is received from the outside, the master BMS 110 may be configured to set the received ID as the source ID.

For example, the master BMS 110 may communicate with the outside. The master BMS 110 may receive an ID for any one of the plurality of slave BMSs 120 from a server or the like. Alternatively, the master BMS 110 may be connected to an input device to receive an ID for any one of the plurality of slave BMSs 120 input through the input device. Here, the input device may be a device capable of outputting an input value by a user manipulation, such as a keyboard, a mouse, and/or a touch screen.

Figure 2:
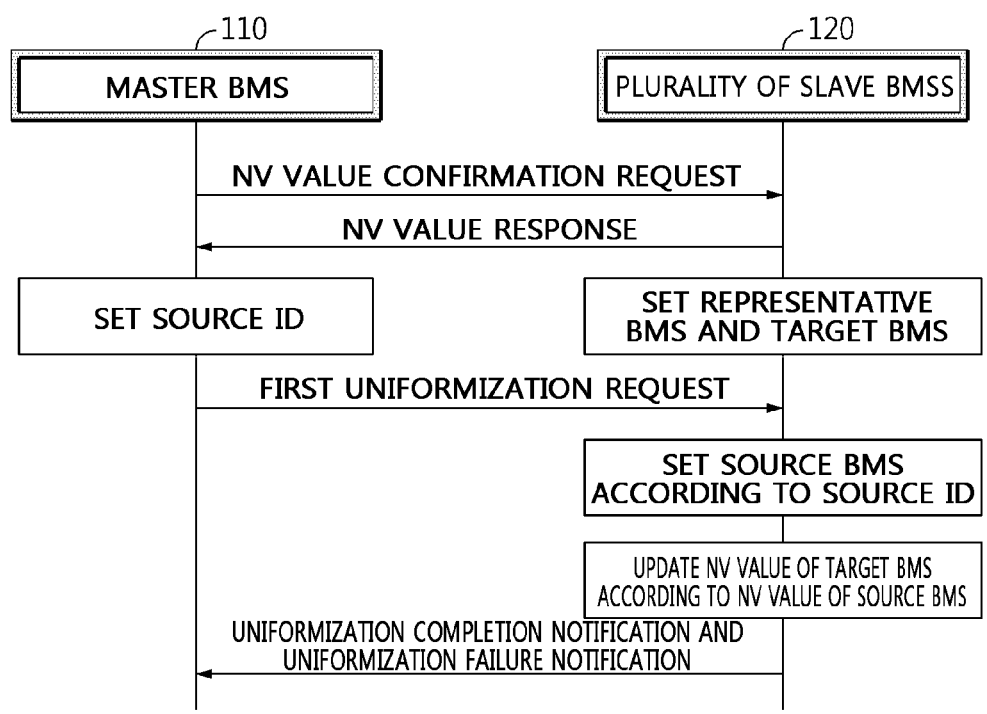
FIG. 2 is a diagram schematically showing an embodiment of the BMS managing apparatus according to an embodiment of the present disclosure.

FIG. 2 is a diagram schematically showing an embodiment of the BMS managing apparatus 100 according to an embodiment of the present disclosure.

Specifically, the embodiment of FIG. 2 is an embodiment in which the master BMS 110 sets the source ID after receiving a response to the NV value from the plurality of slave BMSs 120.

In the embodiment of FIG. 2, when the source ID is set, the master BMS 110 may send the first uniformization request including the source ID to the plurality of slave BMSs 120.

When the first uniformization request is received, the plurality of slave BMSs 120 may set the slave BMS corresponding to the source ID as the source BMS.

That is, the plurality of slave BMSs 120 may set the representative BMS and the target BMS in advance before receiving the first uniformization request from the master BMS 110. In addition, when the first uniformization request is received, the plurality of slave BMSs 120 may set the source BMS according to the source ID regardless of the set representative BMS.

The source BMS may update the NV value of the target BMS by sending its NV value to the target BMS.

Thereafter, the source BMS may be configured to receive whether the NV value is updated and the updated NV value from each target BMS. In addition, the source BMS may be configured to send a uniformization completion notification or a uniformization failure notification to the master BMS 110 according to whether the updated NV value received from the target BMS is the same as its own NV value.

That is, after the source BMS receives the updated NV value from the target BMS and judges whether the update is normally completed, the source BMS may send a uniformization completion notification or a uniformization failure notification to the master BMS 110 according to the judgment result.

Figure 3:
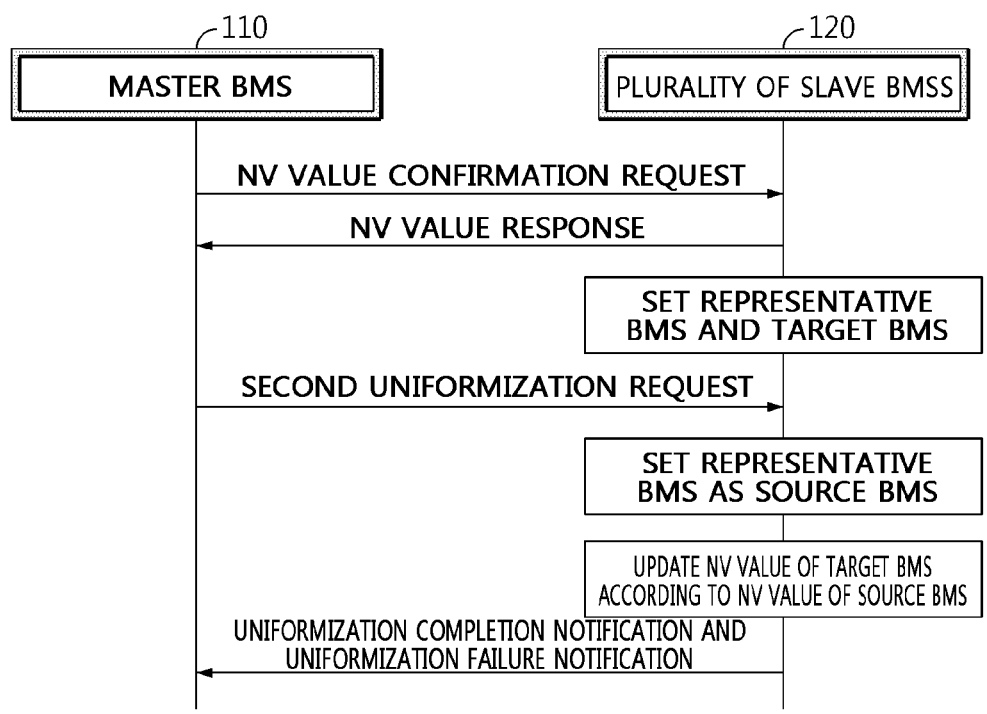
FIG. 3 is a diagram schematically showing another embodiment of the BMS managing apparatus according to an embodiment of the present disclosure.

FIG. 3 is a diagram schematically showing another embodiment of the BMS managing apparatus 100 according to an embodiment of the present disclosure.

Specifically, the embodiment of FIG. 3 is an embodiment in which the master BMS 110 does not set the source ID, unlike the embodiment of FIG. 2.

In the embodiment of FIG. 3, the master BMS 110 may send the second uniformization request not including the source ID to the plurality of slave BMSs 120 when the source ID is not set.

The plurality of slave BMSs 120 may set the representative BMS as the source BMS when receiving the second uniformization request.

That is, the plurality of slave BMSs 120 may set the representative BMS and the target BMS in advance before receiving the second uniformization request from the master BMS 110. In addition, the plurality of slave BMSs 120 may set a preset representative BMS as the source BMS when the second uniformization request not including the source ID is received from the master BMS 110.

In this case, the slave BMS set as the source BMS may send declaration information to inform the remaining slave BMSs that it is selected as the source BMS.

Thereafter, the source BMS may update the NV value of the target BMS by sending its NV value to the target BMS. That is, the plurality of slave BMSs 120 may update the NV value of the target BMS by setting the source BMS by itself, even when the source ID is not received from the master BMS 110.

The source BMS may receive the updated NV value from the target BMS and judge whether the update is normally completed, and then send a uniformization completion notification or a uniformization failure notification to the master BMS 110 according to the judgment result.

Figure 4:
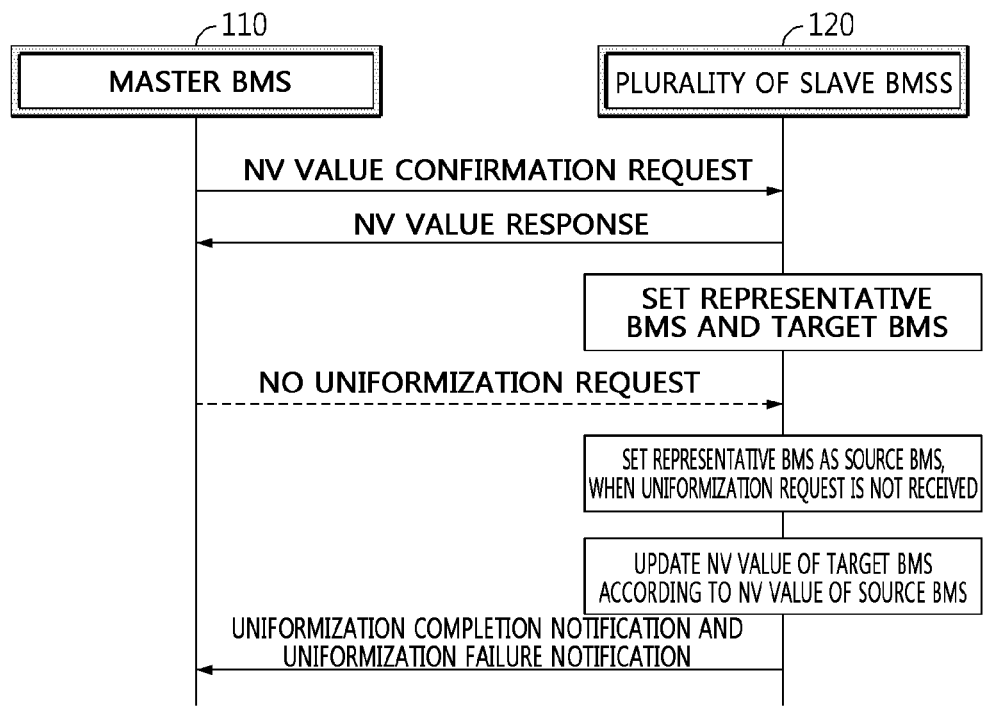
FIG. 4 is a diagram schematically showing still another embodiment of the BMS managing apparatus according to an embodiment of the present disclosure.

FIG. 4 is a diagram schematically showing still another embodiment of the BMS managing apparatus 100 according to an embodiment of the present disclosure.

Specifically, the embodiment of FIG. 4 is an embodiment in which the uniformization request is not received for a predetermined time after the plurality of slave BMSs 120 send a response to the NV value to the master BMS 110 and set the representative BMS and the target BMS, unlike the embodiment of FIGS. 2 and 3.

The plurality of slave BMSs 120 may be configured to set the representative BMS as the source BMS, when the uniformization request is not received for a predetermined time after setting the representative BMS and the target BMS.

For example, when a system failure and/or communication failure occurs in the master BMS 110, the master BMS 110 may not be able to send a uniformization request to the plurality of slave BMSs 120. Even in this case, since the NV value of the plurality of slave BMSs 120 must be updated in order for the plurality of slave BMSs 120 to operate normally, the plurality of slave BMSs 120 may set a preset representative BMS as the source BMS.

That is, the BMS managing apparatus 100 according to an embodiment of the present disclosure has an advantage of updating the NV value of the plurality of slave BMSs 120 even when the plurality of slave BMSs 120 do not receive a uniformization request from the master BMS 110.

FIGS. 5 to 8 are diagrams schematically showing an embodiment in which an NV value of a slave BMS is updated by the BMS managing apparatus 100 according to an embodiment of the present disclosure.

Figure 5:
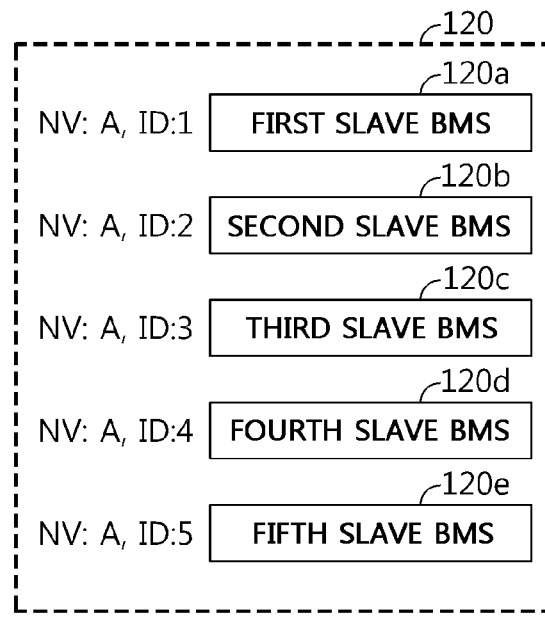
FIGS. 5 to 8 are diagrams schematically showing an embodiment in which an NV value of a slave BMS is updated by the BMS managing apparatus according to an embodiment of the present disclosure.

Specifically, the embodiment of FIG. 5 is an embodiment for a plurality of slave BMSs 120 at an initial stage. In the embodiment of FIG. 5, at an initial stage, the first slave BMS 120*a*, the second slave BMS 120*b*, the third slave BMS 120*c*, the fourth slave BMS 120*d* and the fifth slave BMS 120*e* may be provided.

Figure 6:
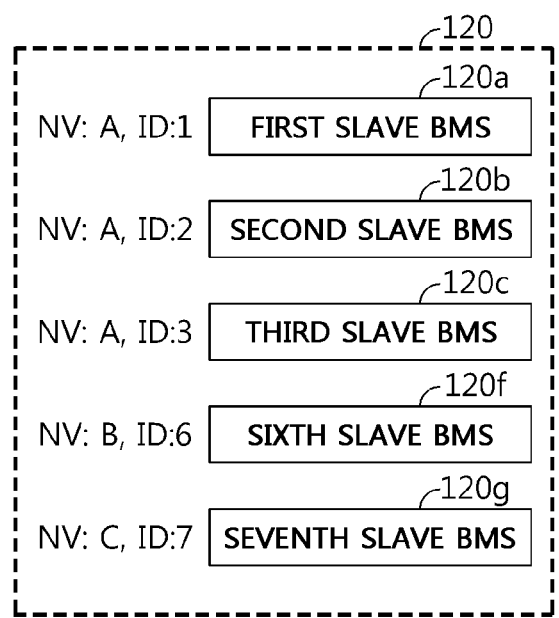

The embodiment of FIG. 6 is an embodiment in which the fourth slave BMS 120*d* is replaced with the sixth slave BMS 120*f* and the fifth slave BMS 120*e* is replaced with the seventh slave BMS 120*g* from the plurality of slave BMSs 120 at an initial stage.

The NV values of the first slave BMS 120*a*, the second slave BMS 120*b*, and the third slave BMS 120*c* may be A, the NV value of the replaced sixth slave BMS 120*f* may be B, and the NV value of the replaced seventh slave BMS 120*g* may be C. That is, the NV values of the replaced slave BMSs 120*f*, 120*g* may be different from the NV value of the existing slave BMSs 120*a*, 120*b*, 120*c*.

Figure 7:
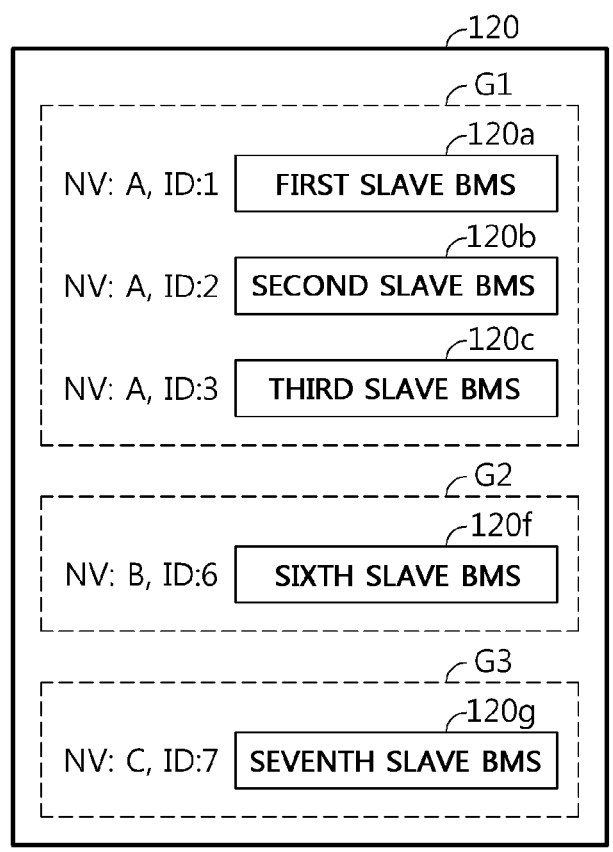

The embodiment of FIG. 7 is an embodiment in which the plurality of slave BMSs 120 are grouped based on the NV values.

The plurality of slave BMSs 120 may be configured to group slave BMSs having the same NV value to generate a major group and at least one minor group according to the number of the included slave BMSs.

For example, in the embodiment of FIG. 7, the plurality of slave BMSs 120 may communicate with each other to check the NV value from each other. Specifically, each of the plurality of slave BMSs 120 may send data including its own ID and its own NV value to the remaining slave BMSs. The plurality of slave BMSs 120 may check the NV value of the other slave BMS through the data received from the other slave BMS.

Three slave BMSs 120*a*, 120*b*, 120*c* may have the NV value of A, one slave BMS 120*f* may have the NV value of B, and one slave BMS 120*g* may have the NV value of C. Among the plurality of slave BMSs 120, slave BMSs having the same NV value may generate a group. A first group G1 may include the first slave BMS 120*a*, the second slave BMS 120*b*, and the third slave BMS 120*c*. A second group G2 may include the sixth slave BMS 120*f*, and a third group G3 may include the seventh slave BMS 120*g*.

In addition, the plurality of slave BMSs 120 may set a group having the largest number of slave BMSs as a major group, and the remaining groups may be set as minor groups.

For example, in the embodiment of FIG. 7, the first group G1 including the three slave BMSs 120*a*, 120*b*, 120*c* may be configured as a major group, and the second group G2 and the third group G3 may be configured as the minor groups.

The plurality of slave BMSs 120 may be configured to set any one of the plurality of slave BMSs 120 included in the major group as the representative BMS.

Specifically, the plurality of slave BMSs 120 may be configured to set a slave BMS having an ID corresponding to a preset condition among the plurality of slave BMSs 120 included in the major group as the representative BMS.

For example, the slave BMS having the lowest ID among the plurality of slave BMSs 120 included in the major group may be set as the representative BMS. In the embodiment of FIG. 7, the first slave BMS 120*a* may be set as the representative BMS.

As another example, the slave BMS having the largest ID among the plurality of slave BMSs 120 included in the major group may be set as the representative BMS. That is, since the plurality of slave BMSs 120 included in the major group have the same NV value, any one slave BMS included in the major group may be set as the representative BMS.

The plurality of slave BMSs 120 may be configured to set the slave BMS included in the at least one minor group as the target BMS.

The NV values of all slave BMSs included in the minor group may be different from the NV values of the plurality of slave BMSs 120 included in the major group. Therefore, all slave BMSs included in the minor group may be set as the target BMS.

Figure 8:
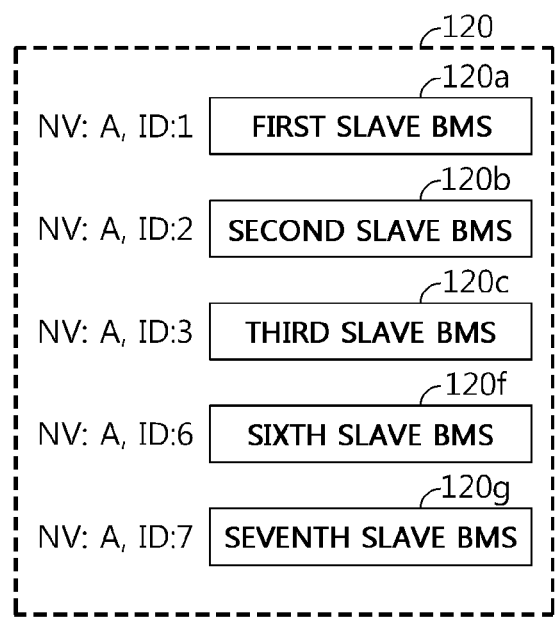

The embodiment of FIG. 8 is an embodiment in which the NV values of the sixth slave BMS 120*f* and the seventh slave BMS 120*g* set as the target BMSs are updated.

The source BMS may be set according to whether the uniformization request is received from the master BMS 110 and the type of the received uniformization request. In addition, the source BMS may update all of the NV values of the target BMSs by sending its own NV value to the target BMS.

For example, in the embodiment of FIG. 8, it is assumed that the first slave BMS 120*a* is set as the source BMS. The first slave BMS 120*a* may send its NV value to the sixth slave BMS 120*f* and the seventh slave BMS 120*g*. The sixth slave BMS 120*f* and the seventh slave BMS 120*g* may receive the NV value from the first slave BMS 120*a* and update their NV values. Accordingly, the NV values of the first slave BMS 120*a*, the second slave BMS 120*b*, the third slave BMS 120*c*, the sixth slave BMS 120*f*, and the seventh slave BMS 120*g* may all be unified as A.

That is, the BMS managing apparatus 100 according to an embodiment of the present disclosure has an advantage that the NV values of the plurality of slave BMSs may be synchronized by itself even if the NV values of the slave BMSs are not individually set by the user.

Meanwhile, it is assumed that, unlike the embodiment of FIGS. 5 to 8, six slave BMSs are provided at an initial stage, and three slave BMSs are replaced among them. If the NV values of the three replaced slave BMSs are all the same, since the three slave BMSs have the same NV values, it may not be easy to set a major group and a minor group.

If the group of the replaced slave BMS is set as the major group, there may be a problem that the NV values of the existing slave BMSs are updated to the NV value of the replaced slave BMS.

In order to prevent this problem from occurring, the master BMS 110 may be configured to store the NV value of the source BMS at the previous updating time as the criterion NV value. In addition, when the plurality of NV values received from the plurality of slave BMSs 120 are classified as the same number, the master BMS 110 may be configured to set an ID of any one of the plurality of slave BMSs 120 having the same NV value as the criterion NV value among the plurality of NV values as the source ID.

That is, the master BMS 110 may store the criterion NV value at the previous updating time in advance, and then classify the NV value received from the plurality of slave BMSs 120 by itself. As a result of the classification, when the same number of slave BMSs are classified, the master BMS 110 may set the ID of the slave BMS having the same NV value as the criterion NV value as the source ID. In this case, even if there is no input for the ID from the outside, the master BMS 110 may directly set the source ID. Accordingly, even if a plurality of groups including the same number of slave BMSs are generated, the NV values of the plurality of slave BMSs 120 may be normally updated based on the source ID set by the master BMS 110.

The BMS managing apparatus 100 according to an embodiment of the present disclosure may be included in an energy storage system (ESS). In general, the energy storage system applied to a power plant driving a large-scale power grid, or a building or a factory that consumes a lot of power, includes a plurality of battery racks respectively having a plurality of battery modules. In addition, the plurality of such battery racks are configured to become a battery bank, and a plurality of battery banks are configured to form a section.

For example, the master BMS 110 may be a bank battery management system (BBMS) corresponding to the battery bank, and each of the plurality of slave BMSs 120 may be a rack battery management system (RBMS) corresponding to a corresponding battery rack.

Accordingly, when the slave BMSs for some of the plurality of battery racks are replaced, the NV values of the replaced slave BMSs may be updated according to the BMS managing apparatus 100.

Figure 9:
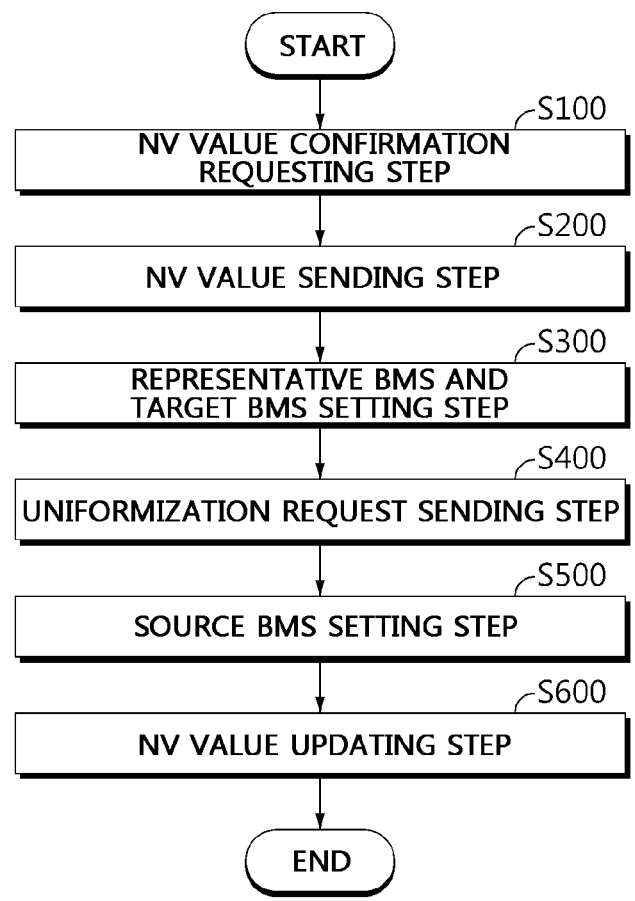
FIG. 9 is a diagram schematically showing a BMS managing method according to another embodiment of the present disclosure.

FIG. 9 is a diagram schematically showing a BMS managing method according to another embodiment of the present disclosure.

Preferably, each step of the BMS managing method may be performed by the BMS managing sing apparatus 100 including the master BMS 110 and the plurality of slave BMSs 120. Hereinafter, for convenience of description, content overlapping with the previously described content will be omitted or briefly described.

Referring to FIG. 9, the BMS managing method may include an NV value confirmation requesting step (S100), an NV value sending step (S200), a representative BMS and target BMS setting step (S300), a uniformization request sending step (S400), a source BMS setting step (S500) and an NV value updating step (S600).

The NV value confirmation requesting step (S100) is a step of sending an NV value confirmation request to the plurality of slave BMSs 120, and may be performed by the master BMS 110.

The NV value sending step (S200) is a step of sending each NV value to the master BMS 110 when the NV value confirmation request is received from the master BMS 110, and may be performed by the plurality of slave BMSs 120.

Each of the plurality of slave BMSs 120 may send its NV value to the master BMS 110 as a response to the NV value confirmation request.

The representative BMS and target BMS setting step (S300) is a step of setting a representative BMS and a target BMS based on the plurality of NV values, and may be performed by the plurality of slave BMSs 120.

Figure 10:
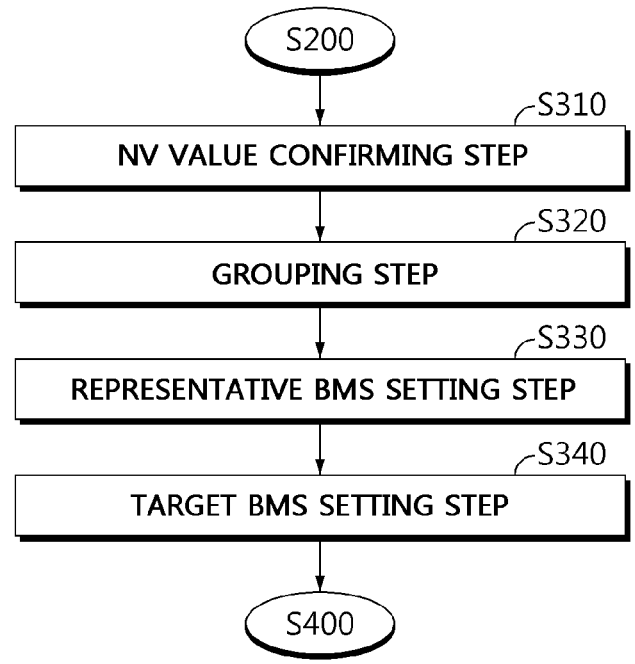
FIG. 10 is a diagram schematically showing a representative BMS and target BMS setting step in the BMS managing method according to another embodiment of the present disclosure.

The representative BMS and target BMS setting step (S300) will be described in detail with reference to FIG. 10. FIG. 10 is a diagram schematically showing the representative BMS and target BMS setting step S300 in the BMS managing method according to another embodiment of the present disclosure.

The representative BMS and target BMS setting step (S300) may include Step S310, Step S320, Step S330 and Step S340.

In Step S310, each of the plurality of slave BMSs 120 may check its NV value and NV values of the other slave BMSs.

For example, in the embodiment of FIG. 7, each of the first slave BMS 120a, the second slave BMS 120b, the third slave BMS 120c, the sixth slave BMS 120f, and the seventh slave BMS 120g may check all of its NV value and the NV values of the other slave BMSs.

In Step S320, among the plurality of slave BMSs 120, slave BMSs having the same NV value may generate a group. In addition, among the generated groups, a group including the largest number of slave BMSs may be set as a major group, and the remaining groups may be set as minor groups.

For example, in the embodiment of FIG. 7, the first slave BMS 120a, the second slave BMS 120b, and the third slave BMS 120c having the same NV value of A may be classified as the first group G1. The sixth slave BMS 120f having an NV value of B may be classified as a second group G2. The seventh slave BMS 120g having an NV value of C may be classified as a third group G3. In addition, the first group G1 including the largest number of slave BMSs may be set as a major group, and the remaining groups (the second group G2 and the third group G3) may be set as minor groups.

In Step S330, any one of the plurality of slave BMSs 120 may be set as the representative BMS. Specifically, any one of the plurality of slave BMSs 120 belonging to the major group may be set as the representative BMS.

For example, in the embodiment of FIG. 7, the first slave BMS 120a included in the first group G1, which is a major group, may be set as the representative BMS.

In Step S340, at least one slave BMS belonging to the minor group may be set as the target BMS.

For example, in the embodiment of FIG. 7, the sixth slave BMS 120f included in the second group G2 and the seventh slave BMS 120g included in the third group G3 may be set as the target BMS.

The uniformization request sending step (S400) is a step of sending a uniformization request to the plurality of slave BMSs 120 based on whether the source ID is set when a response to the NV value confirmation request is received from the plurality of slave BMSs 120, and may be performed by the master BMS 110.

When the source ID is set, the master BMS 110 may send a first uniformization request including the source ID to the plurality of slave BMSs 120. Conversely, when the source ID is not set, the master BMS 110 may send a second uniformization request not including the source ID to the plurality of slave BMSs 120.

The source BMS setting step (S500) is a step of setting the representative BMS or a slave BMS corresponding to the source ID as the source BMS according to the uniformization request received from the master BMS 110, and may be performed by a plurality of slave BMSs 120.

Figure 11:
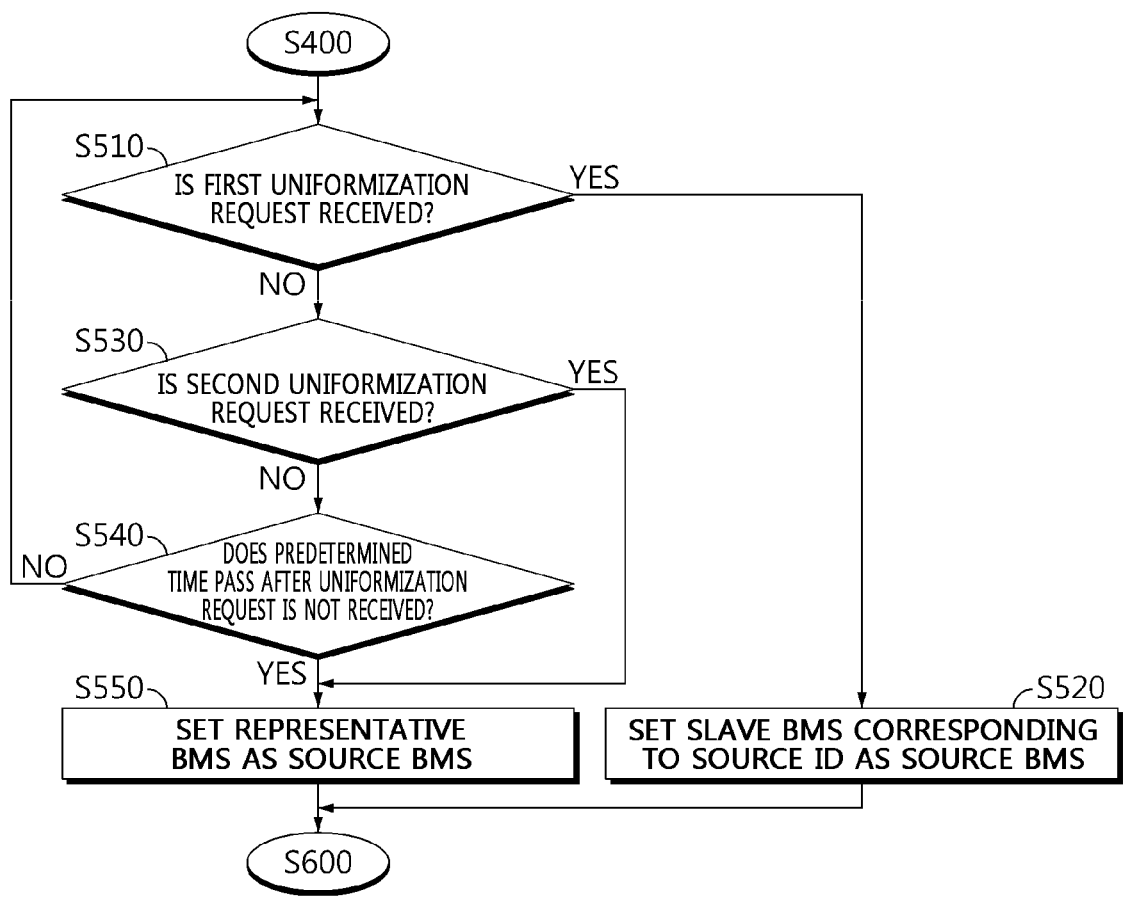
FIG. 11 is a diagram schematically showing a source BMS setting step in the BMS managing method according to another embodiment of the present disclosure.

The source BMS setting step (S500) will be described in detail with reference to FIG. 11. FIG. 11 is a diagram schematically showing a source BMS setting step S500 in the BMS managing method according to another embodiment of the present disclosure.

In Step S510, the plurality of slave BMSs 120 may judge whether the first uniformization request is received from the master BMS 110. If the plurality of slave BMSs 120 receives the first uniformization request, Step S520 may be performed, and if not, Step S530 may be performed.

In Step S520, the plurality of slave BMSs 120 may set the slave BMS corresponding to the source ID included in the first uniformization request as the source BMS. That is, even if the representative BMS is set in advance in Step S330, when the source ID is received from the master BMS 110, the slave BMS corresponding to the source ID may be set as the source BMS. After that, the NV value updating step (S600) may be performed.

For example, in the embodiment of FIG. 7, it is assumed that the source ID included in the first uniformization request received by the plurality of slave BMSs 120 from the master BMS 110 is 2. In this case, the second slave BMS 120b having an ID corresponding to the source ID may be set as the source BMS. That is, even if the representative BMS is set as the first slave BMS 120a in Step S330, the second slave BMS 120b corresponding to the source ID may be set as the source BMS.

In Step S530, the plurality of slave BMSs 120 may judge whether the second uniformization request is received from the master BMS 110. If the plurality of slave BMSs 120 receives the second uniformization request, Step S550 may be performed, and if not, Step S540 may be performed.

In Step S540, the plurality of slave BMSs 120 may judge whether a predetermined time elapses after the uniformization request (the first uniformization request and the second uniformization request) is not received from the master BMS 110 from the time point when the representative BMS and the target BMS are set. If the predetermined time elapses, Step S550 may be performed, and if not, Step S510 may be performed again.

That is, the plurality of slave BMSs 120 may wait for the reception of the uniformization request for a predetermined time after the representative BMS and target BMS setting step (S300). However, if the uniformization request is not received for a predetermined time, Step S550 may be performed to update the NV values of the plurality of slave BMSs 120 normally.

Step S550 is a step of setting the representative BMS set in Step S330 as the source BMS. That is, the plurality of slave BMSs 120 may set a representative BMS set by themselves as the source BMS even if the source BMS is not determined by the master BMS 110 (even if the first uniformization request including the source ID is not received).

For example, in the embodiment of FIG. 7, the first slave BMS 120a set as the representative BMS may be set as the source BMS.

The NV value updating step (S600) is a step of updating the NV value of the target BMS according to the NV value of the source BMS, and may be performed by the plurality of slave BMSs 120.

The source BMS may send its NV value to the target BMS. The target BMS receiving the NV value may update its NV value as the received NV value.

For example, in the embodiment of FIG. 7, the first slave BMS 120a set as the source BMS may send the NV value of A to the sixth slave BMS 120f and the seventh slave BMS 120g set as the target BMS. The sixth slave BMS 120f and the seventh slave BMS 120g may update their NV values to the received NV value of A. Accordingly, in the embodiment of FIG. 8, the NV values of the first slave BMS 120a, the sixth slave BMS 120f, and the seventh slave BMS 120g may all be the same.

The embodiments of the present disclosure described above may not be implemented only through an apparatus and a method, but may be implemented through a program that realizes a function corresponding to the configuration of the embodiments of the present disclosure or a recording medium on which the program is recorded. The program or recording medium may be easily implemented by those skilled in the art from the above description of the embodiments.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Additionally, many substitutions, modifications and changes may be made to the present disclosure described hereinabove by those skilled in the art without departing from the technical aspects of the present disclosure, and the present disclosure is not limited to the above-described embodiments and the accompanying drawings, and each embodiment may be selectively combined in part or in whole to allow various modifications.

REFERENCE SIGNS

100: BMS managing apparatus
110: master BMS
120: plurality of slave BMSs

What is claimed is:

1. A battery management system (BMS) managing apparatus including a master BMS and a plurality of slave BMSs, the BMS managing apparatus comprising:
the master BMS configured to send a non-volatile (NV) value confirmation request to the plurality of slave BMSs, and send a uniformization request to the plurality of slave BMSs based on whether a source ID is set, when a response to the NV value confirmation request is received from the plurality of slave BMSs; and
the plurality of slave BMSs configured to send each NV value to the master BMS when the NV value confirmation request is received from the master BMS, set a representative BMS and a target BMS based on the plurality of NV values, set the representative BMS or one of the plurality of slave BMSs corresponding to the source ID as a source BMS according to the uniformization request received from the master BMS, and update an NV value of the target BMS according to an NV value of the source BMS.

2. The BMS managing apparatus according to claim 1, wherein when an ID for any one of the plurality of slave BMSs is received from an outside, the master BMS is configured to set the received ID as the source ID.

3. The BMS managing apparatus according to claim 2, wherein the master BMS is configured to send a first uniformization request including the source ID to the plurality of slave BMSs, when the source ID is set, and wherein the master BMS is configured to send a second uniformization request not including the source ID to the plurality of slave BMSs, when the source ID is not set.

4. The BMS managing apparatus according to claim 3, wherein the plurality of slave BMSs are configured to set the slave BMS corresponding to the source ID as the source BMS, when the first uniformization request is received, and
wherein the plurality of slave BMSs are configured to set the representative BMS as the source BMS, when the second uniformization request is received.

5. The BMS managing apparatus according to claim 1, wherein after setting the representative BMS and the target BMS, when the uniformization request is not received for a predetermined time, the plurality of slave BMSs are configured to set the representative BMS as the source BMS.

6. The BMS managing apparatus according to claim 1, wherein the plurality of slave BMSs are configured to generate a major group and at least one minor group according to a number of slave BMSs included in a group including slave BMSs having a same NV value, set any one of the plurality of slave BMSs included in the major group as the representative BMS, and set a slave BMS included in the at least one minor group as the target BMS.

7. The BMS managing apparatus according to claim 6, wherein the plurality of slave BMSs are configured to set a slave BMS having an ID corresponding to a preset condition among the plurality of slave BMSs included in the major group as the representative BMS.

8. The BMS managing apparatus according to claim 1, wherein the master BMS is configured to store an NV value for the source BMS at a previous updating time as a criterion NV value, and when the plurality of NV values received from the plurality of slave BMSs are classified into a same number, the master BMS is configured to set an ID for any one of the plurality of slave BMSs having a same NV value as the criterion NV value among the plurality of NV values as the source ID.

9. The BMS managing apparatus according to claim 1, wherein the source BMS is configured to receive whether the NV value is updated and an updated NV value from the target BMS, and send a uniformization completion notification or a uniformization failure notification to the master BMS according to whether the updated NV value received from the target BMS is the same as the NV value of the source BMS.

10. An energy storage system, comprising the BMS managing apparatus according to claim 1.

11. A battery management system (BMS) managing method, which is performed by a BMS managing apparatus including a master BMS and a plurality of slave BMSs, the BMS managing method comprising:
a non-volatile (NV) value confirmation requesting step of sending an NV value confirmation request to the plurality of slave BMSs;
an NV value sending step of sending each NV value to the master BMS when the NV value confirmation request is received from the master BMS;
a representative BMS and target BMS setting step of setting a representative BMS and a target BMS based on the plurality of NV values;
a uniformization request sending step of sending a uniformization request to the plurality of slave BMSs based on whether a source ID is set, when a response to the NV value confirmation request is received from the plurality of slave BMSs;

a source BMS setting step of setting the representative BMS or one of the plurality of slave BMSs corresponding to the source ID as a source BMS according to the uniformization request received from the master BMS; and an NV value updating step of updating an NV value of the target BMS according to an NV value of the source BMS.

* * * * *